June 28, 1960 J. WORDSWORTH 2,942,873
HYDRO-PNEUMATIC SUSPENSION UNITS FOR VEHICLES
Filed Jan. 5, 1959
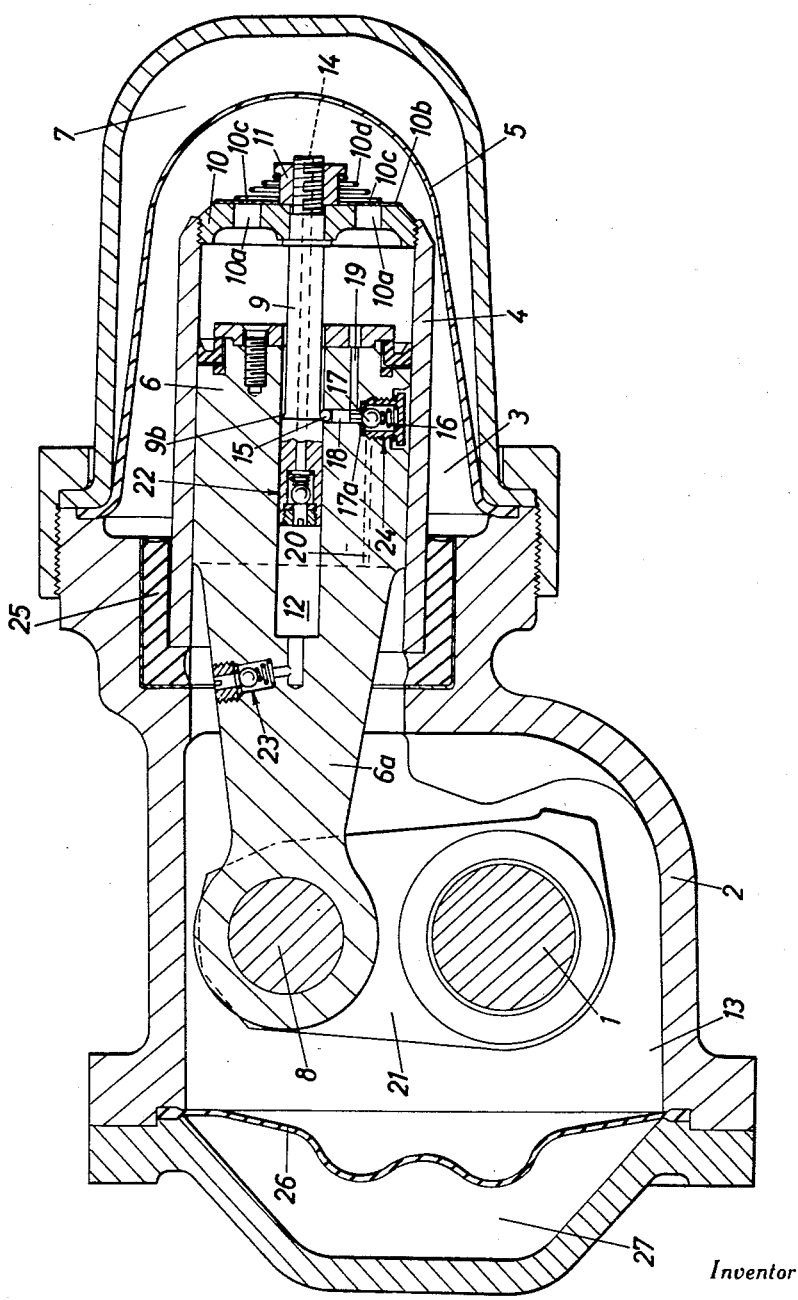
Inventor
Jack Wordsworth
By
Mead, Browne, Schuyler & Beveridge
Attorneys

United States Patent Office 2,942,873
Patented June 28, 1960

2,942,873

HYDRO-PNEUMATIC SUSPENSION UNITS FOR VEHICLES

Jack Wordsworth, York, England, assignor to Armstrong Patents Co. Limited, Beverley, Yorkshire, England, a British company Filed Jan. 5, 1959, Ser. No. 784,922

Claims priority, application Great Britain Jan. 7, 1958

5 Claims. (Cl. 267—64)

This invention concerns hydro-pneumatic suspension units for vehicles.

A vehicle hydro-pneumatic suspension unit is one wherein the functions of the conventional suspension spring and shock absorber usually associated with each wheel mounting are combined within a single unit, and in such units the load exerted on a volume of hydraulic medium by a piston displaceable responsive to vehicle riding movements is balanced by the pressure of a mass or cushion of gaseous medium, usually air, against which the hydraulic medium acts, said gaseous medium thus serving as a pneumatic suspension spring.

It is an object of the invention to provide in a hydro-pneumatic suspension unit, means for maintaining the piston in a predetermined mean position under varying conditions of load applied thereto.

Another object of the invention is to provide a hydro-pneumatic suspension unit having features rendering the production and assembly of said unit simpler, and less critical in manufacturing tolerances, than has been usual hitherto.

According to the present invention, a hydro-pneumatic suspension unit wherein a piston is arranged reciprocably within a cylinder to act on a confined volume of hydraulic medium cushioned by a mass of gaseous medium comprises mutually co-operating means constituting a pump arranged between the piston and the cylinder and operable responsive to piston movements to pump hydraulic medium from a reservoir to increase the volume of the confined hydraulic medium, and a relief valve responsive to piston position within the cylinder to permit flow of hydraulic medium from said confined volume thereof to said reservoir.

The pump means may conveniently comprise a pump plunger mounted axially in a fixed position within the cylinder, and an axial bore formed in the piston and receiving said plunger, one end of the piston bore communicating with the reservoir. Preferably the pump plunger is itself also axially bored and opens into the confined volume of hydraulic medium to constitute a delivering conduit for the pump means.

In order to facilitate proper sliding movement between the piston and the fixed plunger, the cylinder may with advantage be mounted at one end in a resilient mounting such as a rubber bush secured within the main body of the hydro-pneumatic unit. In this way, not only is the need for extremely accurate relative alignment of the piston, the cylinder, and the plunger avoided, permitting a consequent relaxation in manufacturing tolerances, but the connecting rod associated with the piston may be fixedly connected thereto, or may be formed integrally with said piston, thereby eliminating the need for the usual pivotal connection between the two, and enabling the relief valve, together with inlet and outlet valves for the pump means conveniently to be incorporated in the piston, the piston connecting rod and the plunger themselves.

Preferably the relief valve is mounted in the piston, and is arranged to co-act with a raised portion or member on the plunger, serving to define a mean desired position for said piston.

The invention will be described further, by way of example, with reference to the accompanying drawing, which is a longitudinal sectional elevation, taken on a median plane, of a hydro-pneumatic suspension unit constructed in accordance with the invention.

The hydro-pneumatic unit shown in the drawing will be seen to comprise a body 2 adapted for fixing to the chassis or frame of a vehicle, and within which a cylinder 4 is flexibly mounted at one end in a rubber or the like bush 25. A piston 6 is slidably arranged within the cylinder 4, and is formed with an integral connecting rod 6a which, at its end remote from the piston, is secured by means of a pin 8 to a crank 21 located in a chamber 13 of the body 2. This crank 21 is carried by a semi-rotary shaft 1, at least one end of which extends outside the body 2 for connection to a lever (not shown) by means of which the riding movements of a wheel mounting or the like structure are imparted to the hydro-pneumatic unit.

At the end thereof remote from that at which the connecting rod 6a is arranged, the cylinder 4 carries a screwed plug 10 which, except for apertures 10a, closes the cylinder end and provides a mounting for a fixed plunger 9 formed with an axial bore 14. The plunger 9 is secured to the plug 10 by means of a lock nut 11. The same end (that is to say, the head end) of the cylinder 4 is embraced and totally enclosed by a flexible diaphragm 5 which, between the outer end of the piston 6 and the cylinder 4, defines an enclosed and confined space 3. This confined space 3 is completely filled with a hydraulic medium such as oil, and restricted communication between that portion of the space 3 which lies outside the cylinder 4 and plug 10, and that portion of said space which is between the piston end and the plug 10, is permitted by means of flow restricting apertures 10c formed in a plate 10b butted against the plug 10 by means of a spring 10d, thereby providing a shock-absorbing action to movements of the piston 6. Such piston movements in the weight-acting, or bump direction will clearly tend to increase the load exerted on the hydraulic medium in the space 3, and this load is cushioned, or balanced, by the pressure of a mass of compressed gas such as air contained within a further enclosed space 7 defined between a domed end cap or cupola of the body 2 and the flexible diaphragm 5. To provide for a similar action in the rebound direction, the chamber 13 is also completely filled with hydraulic medium, and a second flexible diaphragm 26 is provided adjacent said chamber, and in opposition to the diaphragm 5, a second mass of compressed gas being contained in the space 27 defined between the diaphragm 26 and a further end cap of the body 2.

It will be appreciated that, in the construction thus far described, the volume of hydraulic medium confined in the space 3 is one of the factors determining the position of the piston 6 in the cylinder 4, and that this volume may accordingly be employed via the connecting rod 6a and semi-rotary shaft 1 to determine the attitude to the wheel mounting, of the lever connected to the shaft 1, or in other words, to control the vehicle riding height. For this purpose, in accordance with the invention, the plunger 9 is slidingly received within an axial bore 12 of the piston 6, and the chamber 13 is employed as a reservoir from which, via a non-return valve 23, hydraulic medium is transferred to the space 3 through a second non-return valve 22 and the bore 14, by the pump constituted by the plunger 9 and bore 12. The valve 23, which serves as an inlet valve for the pump, is conveniently arranged in the connecting rod 6a, while the valve 22, acting as the pump outlet valve, controls the bore 14 and is located in the plunger 9. Thus, should the piston 6, as a result of increased load acting thereon (due to increased vehicle loading) be caused to move outwardly in the cylinder 4, that is to say to the right as shown in the drawing, subsequent oscillatory movements of the piston set up by the vehicle motion will cause the pump 9, 12 to transfer hydraulic medium into the space 3, and thus tend to move the piston inwardly once more.

In order to limit this inward movement, and to define a mean position at which it is desired to maintain the piston 6 for the purpose of preserving a constant attitude relative to its wheel mounting, of the lever connected to the shaft 1, the piston is provided with a relief valve 24 adapted, by way of passages 19 and 20 formed in the piston, to allow hydraulic medium to exhaust from the space 3 back to the reservoir 13. This relief valve 24 comprises a ball 17 urged by means of a spring 16 on to a seat 17a communicating with the passage 19. The valve 24 is arranged to open should the piston 6 move inwardly of the cylinder 4 beyond a desired mean position therein, and for this purpose, the plunger 9, although of an external diameter at its free end region such as to constitute a close fit in the bore 12, is relieved to present a reduced diameter portion behind the said end region, a sloping shoulder 9b being formed between the end region and the reduced diameter portion of said plunger. This shoulder 9b determines the aforementioned mean position of the piston 6 in that it is arranged, via a spherical ball 15, to co-operate with a push rod 18 having a portion bearing on the valve member 17. Thus, once the pump 9, 12 has increased the volume of the hydraulic medium confined in the space 3 to an extent where consequent displacement of the piston 6 causes the ball 15 to bear against the shoulder 9b, the push rod 18 urges the ball 17 from its seat to place the space 3 in communication with the reservoir 13. In this way, continual pumping of hydraulic medium from the reservoir 13 to the space 3, allied to continuously repeated relief opening of the valve 24, maintains the piston constantly in its desired mean position for any given value of load exerted on the piston. As already indicated, an increase in the load exerted on the piston 6 causing outward displacement of said piston will result in an increase in the volume of hydraulic medium confined in the space 3, until the piston has been restored to its mean position. Conversely, a reduction in the load exerted on the piston, resulting in inward displacement thereof, will cause the ball 15 to ride up the shoulder 9b, so that the valve 24 is opened and the volume of hydraulic medium in the space 3 is allowed to diminish until the piston is once again restored to its mean position.

I claim:

1. A vehicle hydro-pneumatic suspension unit comprising an at least partly hollow body member, a resilient annular bush secured to said body member, a hydraulic cylinder secured at one end in said bush to extend from and terminate in spaced relationship relative to the remainder of said body member, an oscillatable shaft within the hollow interior of said body member, a crank attached to the shaft within the body member, a piston displaceable within the hydraulic cylinder, said piston being axially bored, a connecting rod integral with the piston and connecting said piston to said crank, said connecting rod being formed with a conduit communicating with said hollow interior and with said piston bore, said hollow interior constituting a reservoir for a hydraulic shock absorbing medium, a dome-shaped elastic diaphragm secured to said body member and enclosing the free end of the hydraulic cylinder, said diaphragm and said cylinder cooperating to define between them a chamber for receiving and confining hydraulic medium, hydraulic medium flow restricting means partly closing the free end of the hydraulic cylinder to permit restricted flow of hydraulic medium between said chamber and the interior of the hydraulic cylinder, a pump plunger secured at one end in said flow restricting means and extending axially of said hydraulic cylinder to engage in said piston bore and permit sliding movement of said piston relative to said plunger, said plunger being axially bored, said plunger bore communicating at one end with said piston bore and at the opposite end with said chamber, a pump inlet valve located in the conduit of the connecting rod, a pump outlet valve located in the bore of the pump plunger, said plunger being formed intermediate its ends with a shoulder, said piston being formed with a conduit extending between the interior of the hydraulic cylinder and said reservoir, a relief valve located in said piston conduit and operable by said shoulder to permit flow of hydraulic medium between the hydraulic cylinder and the reservoir when the piston attains a predetermined position within said cylinder, and means enclosing said flexible diaphragm to define therewith a totally enclosed pneumatic chamber containing a pneumatic medium and thus constituting a pneumatic suspension spring.

2. A vehicle hydro-pneumatic suspension unit comprising a body member formed with a pair of spaced pneumatic chambers each containing a pneumatic medium under pressure, a pair of elastic diaphragms secured to said body member, there being a diaphragm associated with each of said pneumatic chambers to in part define said chamber, said body having a hydraulic cylinder and a reservoir for a hydraulic shock absorbing medium located between said pneumatic chambers, a piston displaceably arranged in said cylinder and adapted for the application of vehicle suspension movements thereto, a hydraulic chamber defined between the head end of said cylinder and the elastic diaphragm of the adjacent pneumatic chamber, said diaphragm separating said pneumatic chamber from said hydraulic chamber, hydraulic medium flow restricting means placing said hydraulic chamber and the hydraulic cylinder in communication with one another, said flow restricting means serving to restrict the flow of hydraulic medium between the cylinder and the hydraulic chamber consequent upon piston displacements, said piston, cylinder and hydraulic chamber constituting a hydraulic shock absorber, hydraulic pump means arranged within the hydraulic cylinder and operable responsive to piston displacements to supply hydraulic medium from the reservoir to the hydraulic chamber, said pump means including an axial bore within said piston communicating with said reservoir and a pump plunger secured to said flow restricting means and extending axially within said cylinder for engagement within said piston bore to permit sliding movement of said piston relative to said plunger, said plunger having a conduit communicating with said piston bore and said hydraulic chamber, and a relief valve within said conduit and operable responsive to the attainment of a predetermined position of the piston and said plunger to permit the exhaust of hydraulic medium from said cylinder to said reservoir, said reservoir being defined between the elastic diaphragm of the other pneumatic chamber and the end of the hydraulic cylinder remote from the flow restricting means, said last-mentioned diaphragm separating said hydraulic reservoir from said other pneumatic chamber, the varying hydraulic pressures in said hydraulic reservoir and said hydraulic chamber set up by said piston displacements being transmitted by said diaphragms to their respective pneumatic chambers, whereby said pneumatic chambers function as pneumatic suspension springs.

3. A vehicle hydro-pneumatic suspension unit comprising an at least partly hollow body member, a resilient bush secured in said body member, a hydraulic cylinder having one end secured in said resilient bush, said cylinder extending from and terminating in spaced relationship to said body member, an oscillatable shaft within the hollow interior of said body member, said hollow interior constituting a reservoir for a hydraulic shock absorbing medium, a crank attached to the shaft within said cylinder, a piston displaceable within said cylinder, said piston being axially bored, a connecting rod integral with the piston and connecting said piston to said crank, said connecting rod being formed with a conduit communicating with said reservoir and with said piston bore, a first elastic diaphragm secured to the body member and enclosing the end of said hydraulic cylinder which is remote from the body member, said diaphragm defining in part a hydraulic chamber for receiving and confining hydraulic medium, hydraulic medium flow restricting means partly closing said remote end of said hydraulic cylinder, a dome-shaped end cap located exteriorly of said first diaphragm and defining together with said first diaphragm, a pneumatic chamber containing a pneumatic medium and thus constituting a pneumatic suspension spring, a pump plunger having one end fixed in said flow restricting means and extending axially of said hydraulic cylinder for engagement within said piston bore to permit sliding movement of said piston relative to said plunger, said plunger being axially bored, said plunger bore communicating with said hydraulic chamber and with said piston bore, a pump inlet valve in the conduit of the connecting rod, a pump outlet valve in the plunger bore, said piston being formed with a conduit extending between the interior of the hydraulic cylinder and the reservoir, a shoulder formed on the pump plunger, a relief valve in said piston conduit and having a valve member adapted for unseating by said shoulder on the attainment of a predetermined position of the piston within the hydraulic cylinder, a second elastic diaphragm secured to said body member and located in the hollow interior of the body member behind said piston, and an end plate spaced from said second diaphragm and closing said body member behind said piston, said end plate and said second elastic diaphragm defining between them a second pneumatic chamber containing a pneumatic medium and thus constitute a pneumatic rebound spring.

4. A vehicle hydro-pneumatic suspension unit comprising a hollow body member, a hydraulic cylinder secured to and extending from said body member and communicating with the hollow interior thereof, an oscillatable shaft within the hollow interior of said body member, a piston displaceable within said hydraulic cylinder, said piston having an axial bore means including a connecting rod connecting said piston to said crank, said connecting rod being formed with a conduit communicating with said hollow interior and with said piston bore, said hollow interior constituting a reservoir for a hydraulic shock absorbing medium, an elastic diaphragm secured to said body member and enclosing the free end of the hydraulic cylinder, said diaphragm and said cylinder cooperating to define between them a chamber for receiving and confining hydraulic medium, hydraulic medium flow restricting means partly closing the free end of the hydraulic cylinder to permit restricted flow of hydraulic medium between said chamber and the interior of the hydraulic cylinder, a pump plunger secured at one end in said flow restricting means and extending axially of said hydraulic cylinder to engage in said piston bore and permit sliding movement of said piston relative to said plunger, said plunger being axially bored, said plunger bore communicating at one end with said piston bore and at the opposite end with said chamber, a pump inlet valve located in the conduit of the connecting rod, a pump outlet valve located in the bore of the pump plunger, said plunger being formed intermediate its ends with a shoulder, said piston being formed with a conduit extending between the interior of the hydraulic cylinder and said reservoir, a relief valve located in said piston conduit and operable by said shoulder to permit flow of hydraulic medium between the hydraulic cylinder and the reservoir when the piston obtains a predetermined position within said cylinder, and means enclosing said flexible diaphragm to define therewith a totally enclosed pneumatic chamber containing a pneumatic medium and thus constituting a pneumatic suspension spring 5. A vehicle hydro-pneumatic suspension unit as defined in claim 4 wherein said hollow body member includes an elastic diaphragm secured thereto and defining one wall of the reservoir within said body member and an end plate secured to said body member and defining a chamber between said end plate and said diaphragm and containing a pneumatic medium.

References Cited in the file of this patent

UNITED STATES PATENTS

| | | |
|---|---|---|
| 2,240,121 | Patterson | Apr. 29, 1941 |
| 2,436,573 | Heynes | Feb. 24, 1948 |
| 2,825,579 | Heiss | Mar. 4, 1958 |

FOREIGN PATENTS

| | | |
|---|---|---|
| 1,100,585 | France | Apr. 6, 1955 |